June 9, 1964  H. F. POPPENDIEK ETAL  3,136,700
CIRCULATING FUEL NEUTRONIC REACTORS
Filed May 17, 1961  5 Sheets-Sheet 3

INVENTORS
NORMAN D. GREENE
BY HEINZ F. POPPENDIEK

ATTORNEY

June 9, 1964    H. F. POPPENDIEK ETAL    3,136,700
CIRCULATING FUEL NEUTRONIC REACTORS
Filed May 17, 1961    5 Sheets-Sheet 4

INVENTORS
NORMAN D. GREENE
BY HEINZ F. POPPENDIEK

ATTORNEY

INVENTORS
NORMAN D. GREENE
BY HEINZ F. POPPENDIEK

ATTORNEY

DIMENSIONLESS RADIAL TEMPERATURE DISTRIBUTION IN PIPE & VORTEX FUEL ELEMENT WITH WALL HEAT TRANSFER FROM REFLECTOR-MODERATOR

INVENTORS
NORMAN D. GREENE
BY HEINZ F. POPPENDIEK

ATTORNEY

United States Patent Office 3,136,700
Patented June 9, 1964

3,136,700
FUEL CHANNEL ELEMENTS FOR CIRCULATING FUEL NEUTRONIC REACTORS
Heinz F. Poppendiek and Norman D. Greene, La Jolla, Calif., assignors to the United States of America as represented by the United States Atomic Energy Commission
Filed May 17, 1961, Ser. No. 110,830
7 Claims. (Cl. 176—47)

The invention relates, in general, to homogeneous neutronic reactors and, more particularly, to improvements in the fuel element core structures of reflector-moderated, circulating-fluid-fuel, neutronic reactors and methods of operating same.

Circulating fuel neutronic reactors including reflector-moderated types of a considerable variety have been disclosed heretofore in the literature. For example, several of such reactors are described in the "Proceedings of the International Conference on the Peaceful Uses of Atomic Energy" held in Geneva in 1955. These include, for example; Aqueous Homogeneous Power Reactor, described on pages 175–185; the Liquid Metal Fuel Reactor, pages 125–133; and Molten Fluoride Power Reactor, pages 180–187 of volume 3, thereof, respectively. Another reactor of this general category is disclosed in Patent No. 2,945,794, issued July 19, 1960, wherein other relevant prior art disclosures are cited. Descriptive details of a reflector-moderated, circulating fuel reactor are also disclosed in copending application Serial No. 699,428, filed November 27, 1958, now Patent No. 3,009,866.

In reactors of the character described, the fuel channels in the reactor core are frequently constructed so as to provide a fuel element with an elongated cylindrical configuration in the nuclear reaction zone of the core. However, research into the heat transfer and fluid flow characteristics of channels of this type in such a reactor has brought to light certain fundamental obstacles to the attainment of optimum thermodynamic efficiencies. Since the neutron flux is at a maximum at the outside boundary of the liquid fuel channel, the rate of fissioning and heat production is also at a maximum in this region. The neutron density distribution decreases progressively towards the axis of the fuel channel with a commensurate decrease in the amount of heat produced in the inner fluid zones wherefore a decidedly nonuniform temperature distribution develops. The minimum amount of heat is produced in the central region of the channel. With unidirectional fluid flow in the axial direction, fluid flow is at a minimum in the boundary region and maximum in the central region. Consequently, the nonuniform temperature distribution produced by the nonuniform neutron flux distribution is aggravated. As a result, high temperatures exist at the core walls and provision must often be made for wall cooling. Moreover, core wall hot spots and serious core wall temperature fluctuations can develop with the production of severe thermal shock stresses, as well as other undesirable effects. The steep radial temperature gradient produced in the fuel greatly lowers the mean temperature of the fuel obtained upon mixing at the core outlet with any fixed maximum permissible core wall temperature. Also, auxiliary components are usually required to extract gaseous fission products from the fuel.

It has now been found that the introduction of a tangential component of fluid velocity effectively modifies the temperature distribution of the fluid fuel in such a nuclear reactor core element so as to eliminate difficulties noted above and even to provide advantages not hitherto obtainable. The necessary fluid flow characteristics are produced by means of a vane system or the equivalent which imparts a whirling motion to the fluid in such a manner that the profile, i.e., radial distribution, of the axial velocity component is appropriately modified. For example, under established flow conditions, with no wall heat transfer, a uniform radial temperature distribution may be produced in the fluid fuel by generating an axial fluid velocity profile having the same shape as the volume heat source profile. Moreover, provision for cooling of the boundary region of the fuel element and of the moderator may be made by employing an overcompensated axial fluid velocity distribution. Such an effect may be termed "fuel cooling," i.e., moderator, or other element cooling effected by the fluid fuel, thereby permitting simplification of reactor construction. Fuel cooling of the moderator would necessarily be employed with high temperature moderators such as beryllium or graphite. Also, it has been found that gases introduced or generated in the system collect along the axis of the fuel element under the influence of the tangential fluid flow velocity condition wherefore gases may be easily collected and purged from the system. Other advantages may be obtained as described more fully hereinafter. A fuel element channel of the character indicated may be termed a "vortex" fuel element in the description, infra.

Accordingly, it is an object of the invention to provide methods and means for improving the heat transfer characteristics of nuclear reactor coolant systems.

Another object of the invention is to provide methods and apparatus wherein a tangential component of fluid velocity is introduced into a fluid flowing in a channel in the core region of a nuclear reactor to modify the fluid flow and attendant heat transfer characteristics therein.

Still another object of the invention is to provide methods and fuel channel constructions for a circulating fuel nuclear reactor wherein a tangential component of fluid flow is introduced to modify the fluid flow and attendant heat transfer characteristics therein.

A further object of the invention is to provide methods and fuel system constructions for circulating fuel, reflector-moderated nuclear reactors wherein a tangential component of fluid flow is employed in a fuel element channel of the reactor to generate the proper axial velocity distribution and thus modify the heat transfer characteristics to obtain sundry beneficial effects.

A further object of the invention is to provide a fuel channel construction for a circulating fuel nuclear reactor including means effective to provide a tangential component of fluid flow velocity in a fluid fuel being circulated therein.

A further object of the invention is to provide methods and fuel system constructions for circulating fuel, reflector-moderated nuclear reactors wherein a tangential component of fluid flow is employed in a fuel element channel of the reactor to increase convective heat transfer from the moderator walls if fuel cooling is also desired.

A still further object of the invention is to provide methods and fuel system constructions for homogeneous (self-moderated), circulating fuel nuclear reactors wherein a tangential component of fluid flow is employed in a fuel element channel to increase centerline fuel velocities in order to achieve a uniform, axial, temperature distribution.

Other objects and advantages of the invention will become apparent by consideration of the following description and accompanying drawings, of which:

The invention may be employed advantageously in constructing homogeneous reactors, in general, and especially in circulating fuel, neutronic reactors. While a moderator may be employed in admixture with the fissionable material in certain types of such reactors, in reflector-moderated types the moderator externally encompasses the fuel channel through which the fluid fuel mixture is circulated. Moreover, volumetric heat sources similar in some respects to those concerned herein may be encountered in other fields.

In general, circulating fuel homogeneous neutronic reactors include a core having one or more fuel channels or a core tank element situated therein. With reflector-moderated types the channels or core tank are surrounded by a suitable moderator which is ordinarily provided with a circulating coolant system for high power operation. The fluid fuel mixture is pumped through the fuel channels wherein heat is generated by the fission process and is circulated through the primary circuit of a heat exchange system wherein heat is transferred to a secondary coolant for use exteriorly of the reactor. The cooled fluid fuel is then recirculated through the fuel channels of the reactor. The reactor is equipped for regulation of the power level and the like in a well-known variety of ways.

Figure 1:
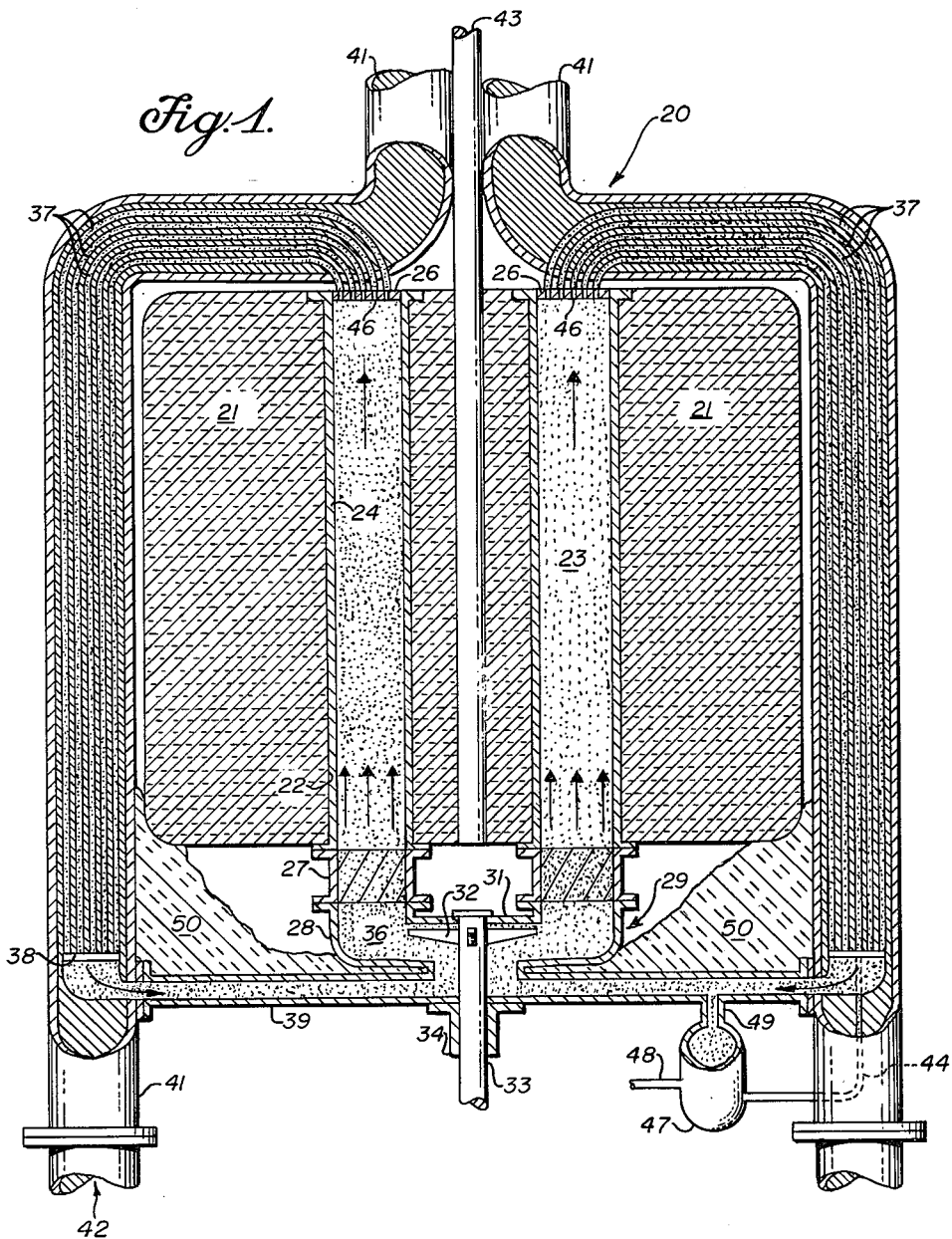
FIGURE 1 is a longitudinal cross-sectional view of a reflector-moderated circulating fluid fuel nuclear reactor core provided with a vortex fuel element in accordance with the invention.

More particularly, utilizing the principle of the invention, a compact reflector-moderated, circulating fuel reactor 20 may be constructed as illustrated schematically in FIGURE 1 of the drawing. The core of such a reactor 20 is constructed as a polygonal or cylindrical moderator-reflector structure 21 provided with one or more longitudinal channels 22 and comprising a solid moderator such as graphite, beryllia or a suitably contained liquid moderator disposed to surround the channels 22. A vortex fuel element 23 including an external cylindrical shell 24, an upper exit orifice element 26, and a lower entrance vane element 27, constructed as described more fully hereinafter, is disposed in each of channels 22. A header 28 couples element 27 to a centrifugal pump 29.

For compactness, the pump 29 may be disposed centrally below the moderator structure 21 with the headers 28 being constructed as extensions of the pump casing 31. An impeller 32 supported by shaft 33 entering through seal 34 is driven by a motor (not shown) in order to circulate fluid fuel 36 through the fuel elements 23. The fluid fuel circuit of the reactor may be completed through a bundle of parallel tubes 37 serving as the primary element of a heat exchanger and arranged as a loop joining the exit orifice element 26 of a fuel element to the intake of pump 29. More specifically, the tubes 37 may be arranged to emerge upwardly away from element 26 and be bent outwardly and downwardly to terminate in a header plate 38 with the fluid fuel 36 being conducted therefrom to the intake of pump 29 by means of a header 39. The secondary circuit of the heat exchanger may be provided as the conduit 41 disposed to enclose a substantial portion or the entire length of the tubes 37, as dictated by heat transfer requirements. The secondary coolant 42 circulated through the heat exchanger may be a liquid metal, e.g., NaK, Bi, Hg, etc., or a suitable organic or an aqueous coolant as desired. The fluid fuel 36 may be a solution or dispersion of uranium in a suitable medium such as water or a liquid metal such as NaK, Bi, etc., as in other homogeneous or circulating fuel reactors which are well known in the art. For high specific power densities liquid metal fuel systems and coolants are preferred.

One or more control rods 43 may be inserted into neutron flux regions of the moderator-reflector structure 21, for example, centrally as shown with auxiliary control apparatus (not shown) arranged to position the control rod as in conventional practice. Removal of fission gas may be effected by providing a conduit tube 44 connecting with a central orifice 46 formed in an exit element 26 and leading through a heat exchanger parallel to tubes 37 to an expansion chamber 47 wherefrom fission products and/or purging gases may be withdrawn from vent 48 while entrained fluid fuel is returned through vent 49 into one of the headers 39. The tangential motion of the fluid fuel has been found to collect the fission and/or purge gases introduced into the system along the axis and expel same in the central region of an exit element 26 whereat the intake to conduit tube 44 is positioned. Thermal insulation 50 is utilized exteriorly of the core and to enclose the pump 29, as well as heat exchanger components, etc.

Figure 2:
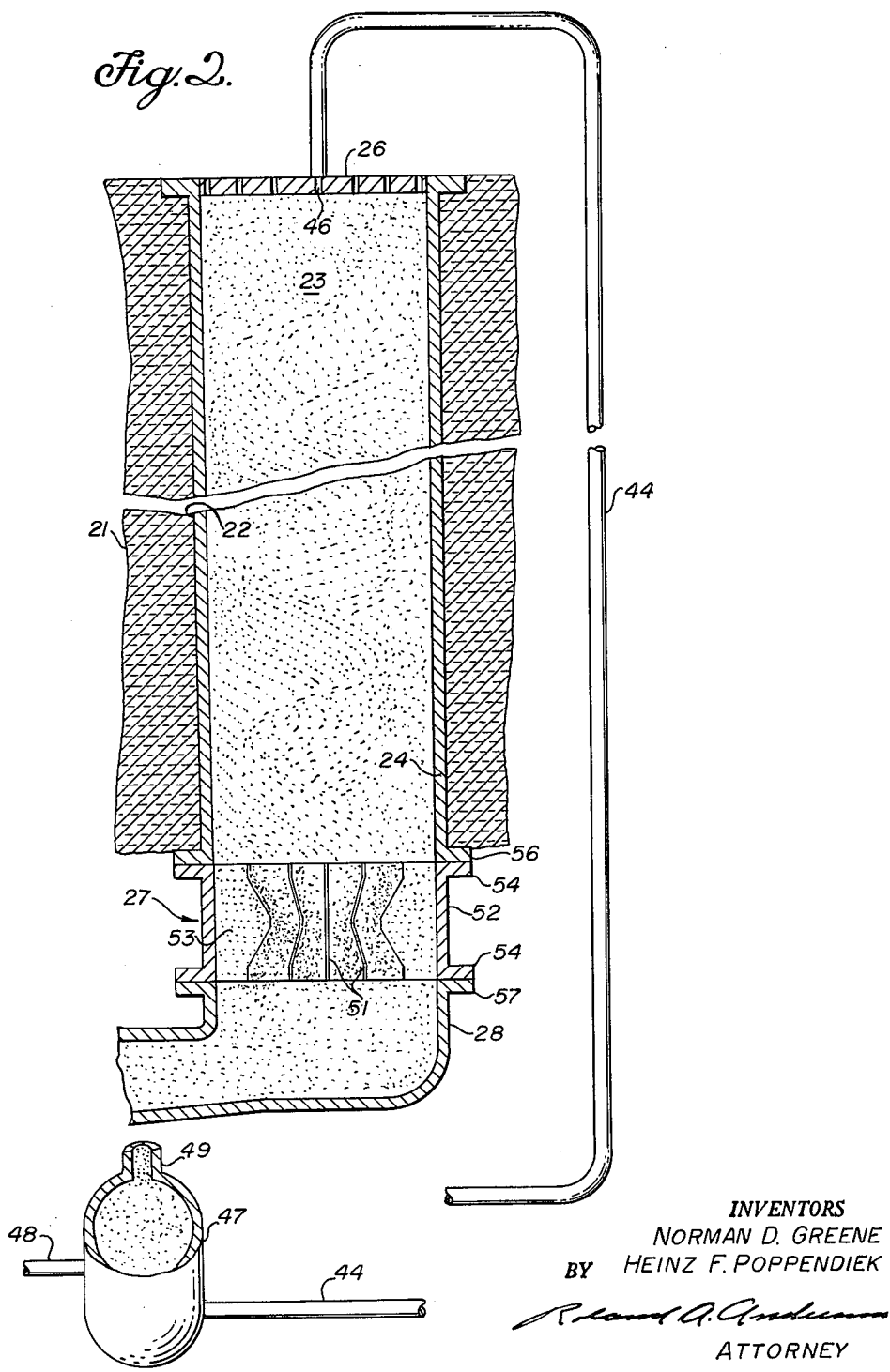
FIGURE 2 is an enlarged view of a fuel element channel of the reactor core of FIGURE 1.
Figure 3:
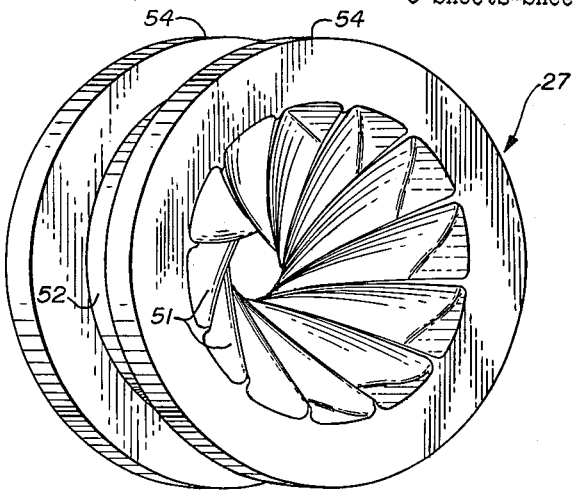
FIGURE 3 is a perspective view of the vane element of FIGURE 2 employed to provide the tangential fluid velocity component in the circulating fuel.

Further details of the vortex fuel channel arranged for gas removal, as illustrated in FIGURE 1, are shown in FIGURE 2 of the drawing wherein the vane element 27 is provided with vanes 51 projecting radially inwardly from the cylindrical collar 52 into passageway 53 as described more fully hereinafter. For convenience, vane element collar 52 may be joined to shell 24 and header 28 by means of flanges 54. To accomplish same, flanges 56 and 57, are provided on shell 24 and header 28, respectively. The upper exit orifice element 26 is shown as a perforated plate. Such plate is perforated with a distribution and size of perforation providing an axial flow pattern similar to that which exists in the fuel element in order to preserve the tangential and axial velocity relationships therein. More specifically, the perforations are distributed with respect to the radius of the plate in a manner such that the pressure drop of the fuel is proportional to the square of the axial velocity of the fuel passing therethrough. Alternatively, perforated plate 26 may be replaced with a vane element 27, if desired, provided that the trailing edge of the vanes of the latter is now oriented as the leading edge with reference to fluid flow entry. When so positioned the vane element does not disturb the flow pattern of the fluid and may even tend to stabilize such pattern.

Figure 5:
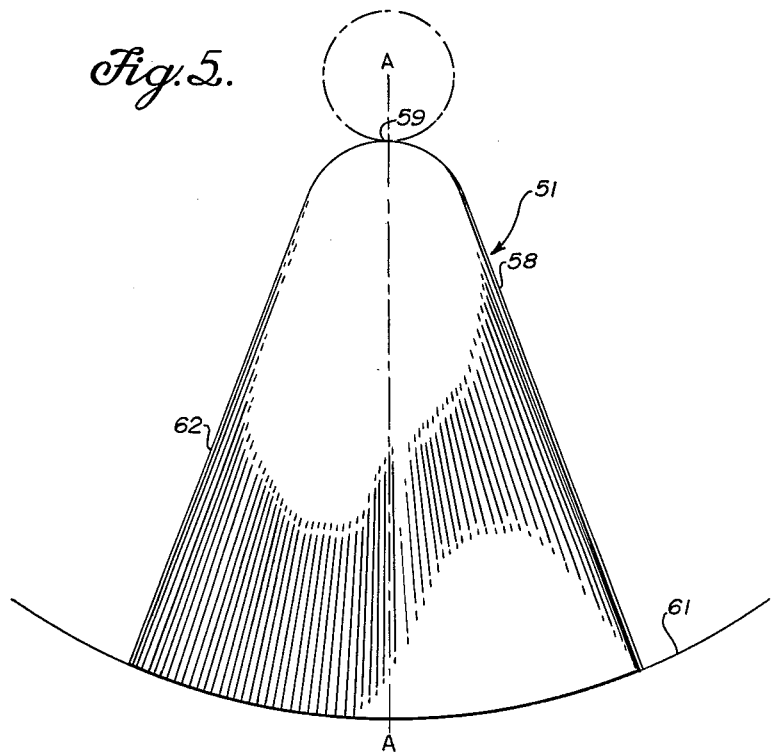
FIGURE 5 is a plan view of the vane of FIGURE 4.
Figure 4:
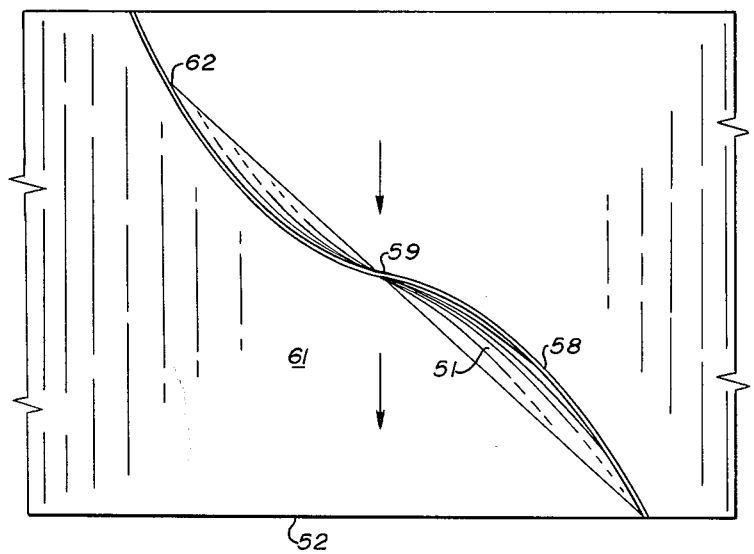
FIGURE 4 is an elevational view of a single vane from the vane element of FIGURE 3.
Figure 3:
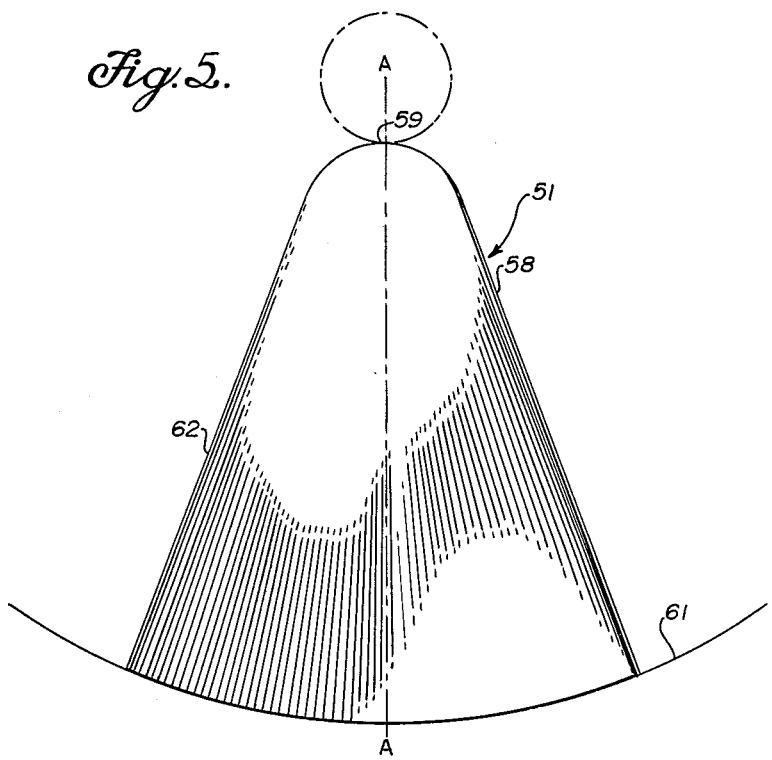
Figure 4:
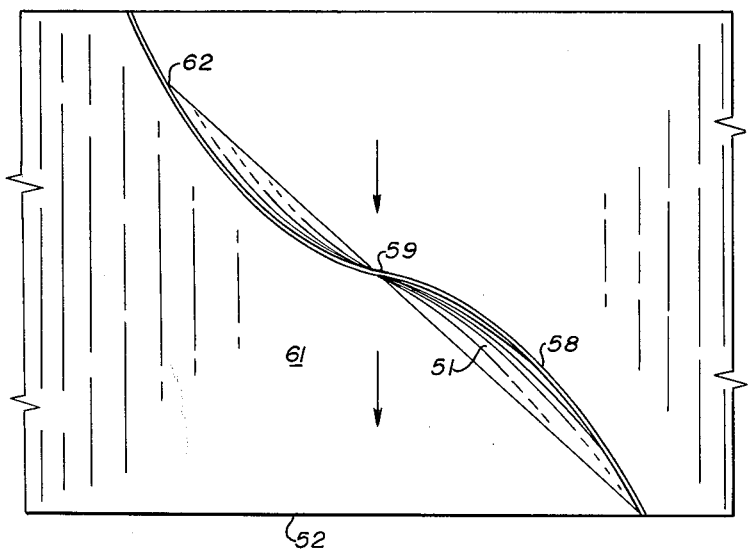

Referring now to FIGURES 4 and 5, a single vane 51 of element 27 is shown in elevation and plan, respectively, with the trailing edge of the vane being 58. The angle of discharge, $\theta$, to be determined, as specified hereinafter, is the angle between a tangent to the vane surface adjacent edge 58 and a horizontal, i.e., transverse, plane. As may be noted, such angle becomes progressively larger proceeding from vane tip 59 to the juncture with the inner surface 61 of collar 52. The leading edge 62 of vane 51 may be constructed as generally symmetrically twisted in opposition to edge 59 upwardly about axis A—A of FIGURE 5. Accordingly, the tangential relationship of the leading edge 62 will be similar to that of the trailing edge 58 with reference to a transverse plane.

While the indicated angle $\theta$ is the factor, perhaps predominantly determinative in determining the velocity relationships of the fluid discharged from the vane 51, it will be appreciated that a sufficient number of vanes should be employed to reliably assure establishment of the desired flow pattern across the tube. As many as twelve or more vanes may be used. Moreover, the total surface of the vane tends to exert an influence on the flow pattern. The purpose of such vane system may be stated simply to be to establish proper axial velocity relationships and other flow characteristics in the fluid fluel mixture during transit through the fuel element, i.e., the core region of the reactor.

The vanes 51 may be formed by preparing sheet metal blanks in the generally triangular shape shown in FIGURE 5. The blanks are then twisted about axis A—A through said angle $\theta$ to yield the shape shown in FIGURE 4 and the twisted vanes may then be soldered at the tips 59 to a mandrel in proper assembly position. The peripheral portions of the vanes may then be machined to afford proper fit of the assembly for brazing of the bases of vanes 51 to surface 58 whenceforth the mandrel may be removed.

The requisite characteristics of such a vane system will now be set forth. Consider first the chief heat transfer mechanisms which control the temperature field within a fissioning fluid. In the steady state the heat generated in a stationary differential lattice through which the fuel is flowing is lost axially by convection and radially by conduction or eddy transfer. The differential equation which describes these mechanisms in a simple cylindrical system is:

$$(\text{I}) \quad u(r)\frac{\partial t}{\partial x} r = \frac{\partial}{\partial r}\left[(a+e(r,u))r\frac{\partial t}{\partial r}\right] + \frac{W(r)r}{\gamma c_p}$$

where:

$u(r)$ is the fluid velocity profile
$t$ is the temperature at radius $r$
$x$ is the axial distance
$r$ is the radial position
$a$ is the thermal diffusivity
$e$ is the eddy diffusivity
$W(r)$ is the volumetric heat source at radius $r$
$\gamma$ is the fluid weight density
$c_p$ is the fluid heat capacity If the mean volume heat source in such an elementary reactor core fuel element is axially uniform and if the element is long enough so that the thermal and hydrodynamic flow patterns are established and also if no heat is transferred to or from the fuel at the wall, the above partial differential equation reduces to a simpler total differential equation.

$$(\text{II}) \quad \frac{W_m r}{\gamma c_p}\left[\frac{u(r)}{u_m} - \frac{W(r)}{W_m}\right] = \frac{d}{dr}\left[(a+e)r\frac{dt}{dr}\right]$$

where $W_m$ is the mean volumetric heat source strength. The first term on the left-hand side of the equation represents axial convection and the second term represents the volume heat source. Note that if the velocity function, $u(r)/u_m$, and the volume heat source function, $W(r)/W_m$, are made identical, there will be no radial heat transfer in the liquid fuel and hence no difference between the reflector-moderator wall temperature and the bulk fuel temperature. For example, consider a cylindrical reactor configuration that is reflector-moderated and has the following arbitrary, but typical dimensionless radial volume heat source distribution:

$$(\text{III}) \quad \frac{W(r)}{W_m} = 0.60 I_0(2.08\rho)$$

where, $$\rho = \frac{I}{I_0}$$

$I_0$ being a Bessel function of the first kind of zero order. An axial velocity distribution can be generated within the cylinder or fuel tube by means of the vane system described above which then creates a stable vortex. Such a profile can be represented by the following series:

$$(\text{IV}) \quad \frac{u(r)}{u_m} = C_0 + C_1\rho + C_2\rho^2 + \ldots$$

where, $$\rho = \frac{I}{I_0}$$

Figure 6:
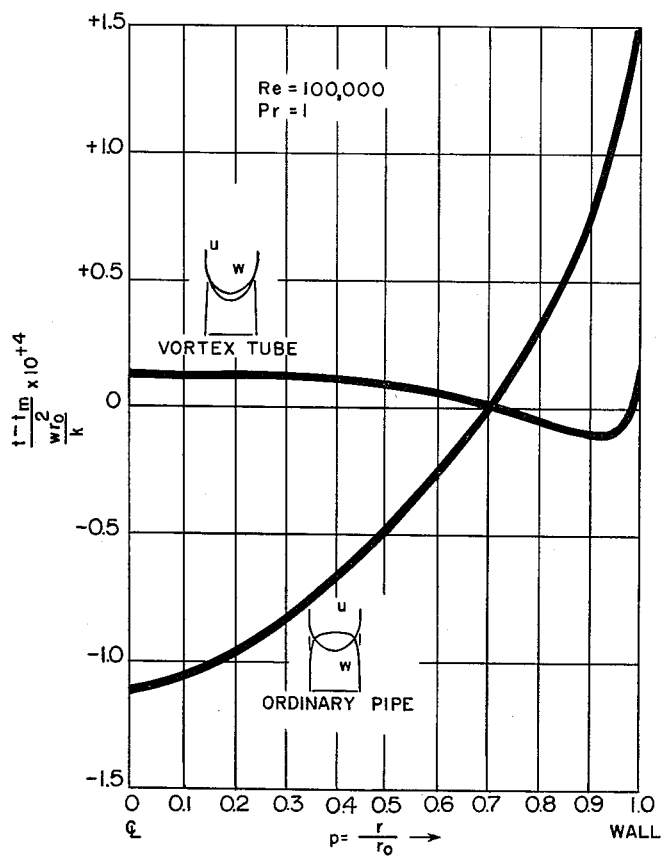
FIGURE 6 is a graphical representation of dimensionless radial temperatures in vortex and ordinary cylindrical channels without wall heat transfer.

This axial velocity profile closely approximates the shape of the volume heat source distribution given by the previous equation. Substitution of III and IV into II followed by double integration yields a solution describing the radial temperature distribution in the vortex tube fuel element with an insulated wall. Plotting the solution to the equation as shown in FIGURE 6 reveals that the radial temperature distribution is almost uniform, i.e., the fuel temperature across the tube is essentially constant.

Figure 7:
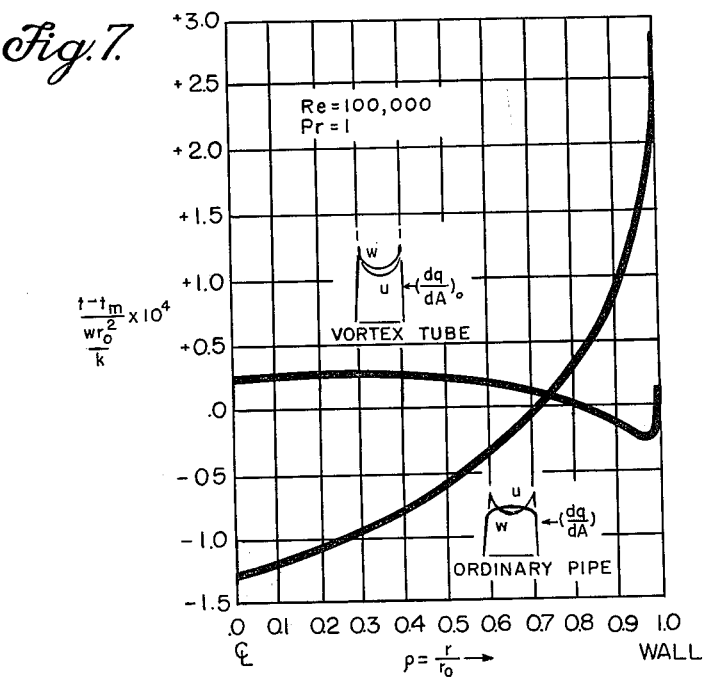
FIGURE 7 is a graphical representation of the velocity distribution in a vortex fuel element with a Bessel function volume heat source distribution and the ordinary turbulent velocity profile in a cylindrical channel.

If a heat flux exists at the fuel element or tube wall in addition to the volume heat source, i.e., fissioning heat source of the liquid fuel in the channel, the velocity profile must be further modified by adjusting the vanes to afford wall cooling. Such a profile with the volume heat source and added wall heat source is shown in FIGURE 7.

It has been found highly desirable that the outermost spiral lamina of the flowing fluid fuel possess a velocity of at least about three times the mean fluid velocity since such an increase in the spiral velocity component causes a corresponding increase in the stability of the axial velocity distribution. The limiting spiraling velocity would appear to be that peripheral velocity at which the total pressure drop in the element becomes objectionable or otherwise intolerable conditions arise as noted above.

If a tangential velocity component is imparted to a fluid fuel flowing through a cylindrical fuel channel, the following analysis may be used to determine approximately the angular variation between the tangent to the trailing edge of the inlet vane, and the direction of the tangential velocity component:

*Preferred Example*

$$\vec{u}_r = \vec{u}_a + \vec{u}_t$$

or, $$u_a = u_t \tan \theta$$

Figure 8:
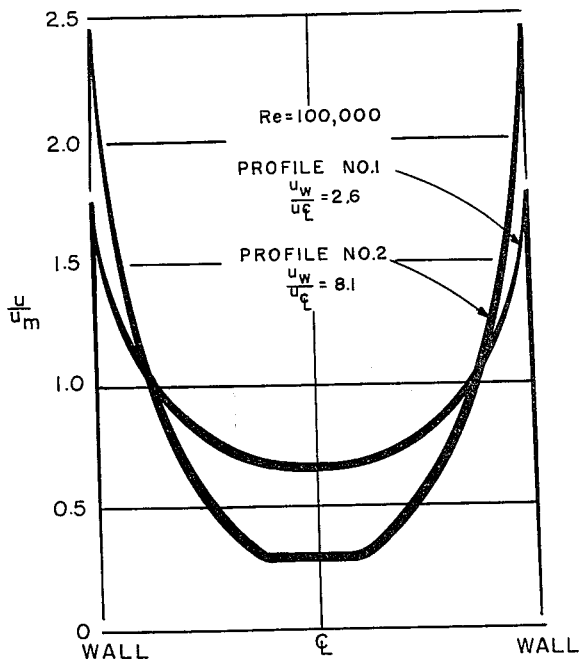
FIGURE 8 is a graphical representation of experimental axial velocity profiles obtained in a vortex tube element.

But, for the specific experimentally achieved case (Profile No. 1, FIGURE 8):

$$u_a = 0.6 \ u_m I_0(2.08\rho)$$

where the constants in the above equation were obtained from the experimental data in profile No. 1, FIGURE 8.

One can write, $$\tan \theta = \frac{0.6 u_m I_0(2.08\rho)}{\tau_t}$$

or, $$\theta = \text{arc tan} \frac{0.6 u_m I_0(2.08\rho)}{u_t}$$

for a forced vortex, $u_t = C\rho$.

Thus $$(\text{V}) \quad \theta = \text{arc tan} \frac{0.6 u_m I_0(2.08\rho)}{C\rho}$$

where:

$u_a$ = axial velocity component of fuel at any point, $r$
$u_m$ = mean, fluid velocity, axial
$u_r$ = resultant velocity
$u_t$ = tangential velocity component of fuel
$\theta$ = angle between resultant and tangential velocity component
$I_0$ = modified Bessel function of the zero order and of the first kind
$\rho = r/r_0$, i.e., ratio of radius at any point to that of the channel radius
$C$ = constant defining the tangential velocity strength If solid body rotation of the fluid is assumed at the exit of the vane system, $\theta$, as given in V, specifies the angle between a tangent to the trailing edge of the discharge vane at any point on the radius $(r)$, and a line perpendicular to the centerline of the cylindrical channel. $u_t$, the remaining unknown is specified by the constant C. The larger $u_t$ becomes, the more stable is the axial velocity distribution. The limiting value would be that velocity at which cavitation at the centerline of the vortex occurs. Increasing the tangential velocity of the vortex would also result in the following advantages:

(1) Increased heat transfer from moderator or channel walls to fuel.
(2) Small temperature differences resulting from possible imperfect matching of axial velocity distribution to the volume heat source distribution would be further reduced by the increased radial eddy diffusivity of the vortex flow field.

For illustrative purposes only, the following example of the computation of $\theta$ at one radial position in a typical reflector-moderated reactor is offered:

*Numerical Example*

Using Equation III:

$$\theta(r) = \arctan \frac{u_m 0.60 I_0(2.08\rho)}{u_t}$$

Assuming that the desired $u_m = 2.40$ ft./sec., that $r_0 = 0.20$ ft., and that as a boundary condition $u_t = 3u_m$ at $r = r_0$ ($\rho = 1$):

$$\theta(r_0) = \arctan \frac{1.44 I_0(2.08)}{7.20}$$

$$\therefore \theta(r_0) = \arctan \frac{1.44 \times 2.37}{7.20}$$

where, $I_0$ (2.08) may be approximated by the following series:

$$I_0(2.08) = 1 + \frac{(2.08)^2}{4} + \frac{\frac{(2.08)^4}{2}}{(2.1)^2}$$

Thus:

$$\theta(r_0) = 25°22'$$

*Experimental Apparatus*

Verification of the velocity distributions was obtained using a 5″ I.D. 40″ length Lucite (polymethyl-methacrylate resin) vortex tube having adjustable vanes (12 in number) in entrance and exit elements. Four miniature Pitot tubes were disposed at spaced positions along the wall in a manner permitting traverse of the volume usually at ¼″ intervals. Such Pitot tubes were installed, one each respectively, near entrance and exit orifices to permit spiral decay studies and the other two were located near the center of the tube, one of which was used to obtain detailed distribution data and the other to ascertain the average velocity between the wall and ⅓₂″ from the wall, i.e., near the wall. The latter was possible since it was found that a variation of ±10 degrees in the angle of attack of the Pitot tube had no effect on the measured velocity pressure. Qualitative studies of flow patterns were also made with a phosphorescent particle technique. The total pressure drop across the test section, i.e., between the two vane elements, was determined at the highest flow rates corresponding to an axial Reynolds number of approximately 100,000 in water.

Heat transfer experiments were performed in systems where uniform volume heat sources were generated electrically. The resulting experimental radial temperature profiles were in good agreement with the corresponding theory.

*Experimental Results*

FIGURE 8 graphically represents two normalized velocity distributions corresponding to two vortex vane settings. The indicated distributions were obtained at the mid-section of the tube, but measurements at the ends indicate the distribution was virtually identical throughout the length of the tube. The velocity distributions were determined for maximum flow rates which corresponded to a Reynolds number of 100,000 in a 5 inch tube.

The measurement of axial fluid velocity at the wall yielded a surprising discovery. It was found that the axial fluid velocity component peaked sharply at a point not more than ⅓₂ inch from the fluid-wall interface. Since a Pitot tube indicates average velocity across the tip, it may therefore be concluded that the axial velocity peak occurred at some point less than ⅓₂ inch from the wall and that the boundary layer must be extremely thin. The benefits resulting from this velocity peaking are two-fold. Firstly, it is demonstrated that the fluid velocity distribution can be made to match the volume heat source distribution satisfactorily close to the channel wall. Secondly, the high peak fluid velocities at the channel wall result in highly desirable, increased heat transfer from the wall to the fluid in the event that it is wished to design a fuel-cooled reactor core.

Since the flow configuration in the vortex tube is a type somewhat similar to that developed in some separatory systems, it was conceived that gases would separate due to the centrifugal force field existing therein. The feasibility of such separation was demonstrated as follows: Air, introduced into the experimental vortex element (see FIGURE 2) at a point preceding the entrance vane system was found to collect, in toto, at the center of the exit plate wherefrom it was vented to the exterior.

A pressure measurement across the vortex tube element at a flow rate corresponding to an axial Reynolds number of 100,000 indicated a drop of 2.43 lbs./sq. inch from the boundary region to the axis related to such a centrifugal force field.

While there has been described in the foregoing what may be considered to be preferred embodiments of the invention, modification may be made therein without departing from the spirit of the invention and it is therefore intended to cover all such embodiments as fall within the scope of the appended claims.

What is claimed is:

1. A fuel channel element for a circulating fluid fuel nuclear reactor including a moderator core region provided with a fuel channel having entrance and exit extremity regions for conducting a fluid fuel through the core of said reactor, an elongated cylindrical tubular member adapted to be disposed in said channel to extend between said entrance and exit extremity regions, an element disposed in the entrance extremity region of said tubular member provided with a plurality of vanes projecting within said channel for imparting a tangential component of velocity to said fuel as discharged therefrom and thereby cause the profile of the axial component of the fluid velocity to approximate the volumetric heat production profile in said channel, and a discharge element disposed in the exit extremity of said tubular member similar to the entrance element, however, with an oppositely directed orientation.

2. The fuel channel element as defined in claim 1 wherein said discharge element comprises a perforated plate in which the size and radial distribution of the perforations is such that the pressure drop of said fluid fuel flowing therethrough is proportional to the square of the axial velocity of the fluid fuel.

3. The fuel channel element as defined in claim 1 wherein said vanes are curved to provide a spiraling velocity in the outermost spiral lamina in the fluid fuel flowing therethrough of from about three times the mean fluid velocity to the limiting velocity at which axial cavitation occurs.

4. A fuel channel element for a circulating fluid fuel nuclear reactor including a moderator core region provided with a fuel channel having entrance and exit extremity regions for conducting a fluid fuel through the core of said reactor, an elongated cylindrical tubular member adapted to be disposed in said channel to extend between said entrance and extremity regions, an element disposed in the entrance extremity region of said member provided with a plurality of vanes projecting within said channel with the angle between a tangent to the vane surfaces adjacent the innermost edges and a transverse plane being substantially defined by the equation:

$$\theta = \arctan \frac{0.6 I_0(2.08\rho)}{C\rho}$$

where:

$\theta$ = angle between resultant and tangential components in the discharge fluid;
$I_0$ = modified Bessel function of the zero order and of the first kind;
$\rho = r/r_0$, i.e., ratio of radius at any point to that of the channel radius;
$C$ = constant defining the tangential velocity strength;

and means disposed at the exit of said member providing a pressure drop in the fluid fuel flowing therethrough proportional to the square of the axial velocity of said fuel at each radial position therein.

5. The fuel channel element as defined in claim 4 wherein said exit means comprises a multiplicity of vanes similar to those of said entrance element disposed radially within said channel with the angle between the leading edge of said vanes and a plane normal to the axis of said channel being equivalent to the similar angle of discharge of said entrance vanes at a similar radius.

6. The fuel channel element as defined in claim 4 wherein said exit means comprises a perforated plate.

7. In combination in a reflector-moderated, circulating fuel nuclear reactor including a core with a moderator region and having at least one fluid fuel channel passageway with entrance and exit extremities and traversing the moderator region in the core of said reactor, an elongated cylindrical tubular member disposed between said entrance and exit extremities within said passageway in the core of said reactor, an element at the entrance to said tubular member, said element being provided with a plurality of vanes projecting within said channel and formed to impart a higher tangential component of velocity to the fluid fuel discharged therefrom in central channel regions as compared to peripheral regions wherefore the axial velocity profile across said channel is made to more nearly match the volumetric heat production profile therein, an exit element disposed at the discharge extremity of said tubular member providing a pressure drop in the fluid fuel flowing therethrough proportional to the square of the axial velocity of said fuel at each radial position therein, pump means arranged in proximity and coupled to said entrance element, and a heat exchanger arranged in proximity to said reactor core and coupling said exit element to the intake to said pump.

References Cited in the file of this patent
UNITED STATES PATENTS

| | | |
|---|---|---|
| 1,015,831 | Pielock et al. | Jan. 30, 1912 |
| 1,827,727 | Blizard | Oct. 20, 1931 |
| 2,020,194 | Kuhlman | Nov. 5, 1935 |
| 2,318,206 | Eisenlohr | May 4, 1943 |
| 2,581,134 | Kaiser | Oct. 3, 1950 |
| 2,658,530 | Odell | Jan. 1, 1952 |
| 2,874,106 | Hammond et al. | Feb. 17, 1959 |
| 2,978,399 | Silverman | Apr. 4, 1961 |
| 3,009,866 | Fraas et al. | Nov. 21, 1961 |
| 3,027,143 | Furgerson et al. | Mar. 27, 1962 |